United States Patent
Chen et al.

(10) Patent No.: US 10,296,234 B2
(45) Date of Patent: May 21, 2019

(54) METHOD AND APPARATUS FOR ADJUSTING THROUGHPUT OF STORAGE DEVICE

(71) Applicant: EMC IP Holding Company LLC, Hopkinton, MA (US)

(72) Inventors: Peng Chen, Chengdu (CN); Kevin Kun Yang, Chengdu (CN); Yu Wen, Chengdu (CN); Venoy Qiang Ma, Chengdu (CN); Harley Hua Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/629,612

(22) Filed: Jun. 21, 2017

(65) Prior Publication Data

US 2017/0364281 A1    Dec. 21, 2017

(30) Foreign Application Priority Data

Jun. 21, 2016    (CN) .......................... 2016 1 0454607

(51) Int. Cl.
*G06F 12/00*    (2006.01)
*G06F 3/06*     (2006.01)

(52) U.S. Cl.
CPC .......... *G06F 3/0613* (2013.01); *G06F 3/0631* (2013.01); *G06F 3/0685* (2013.01)

(58) Field of Classification Search
CPC ..... G06F 3/0613; G06F 3/0631; G06F 3/0685
See application file for complete search history.

(56) References Cited

U.S. PATENT DOCUMENTS

2013/0111112 A1* 5/2013 Jeong .................. G06F 13/1689
711/103

* cited by examiner

*Primary Examiner* — Gurtej Bansal
(74) *Attorney, Agent, or Firm* — Krishnendu Gupta; Lesley Leonessa (57) ABSTRACT

Embodiments of the present invention relate to a method and apparatus for adjusting throughput of a storage device. The method comprises setting input/output (I/O) delay time of the storage device to be threshold delay time, the threshold delay time being below initial I/O delay time of the storage device. The method further comprises obtaining measured throughput of the storage device, the measured throughput being associated with the threshold delay time. The method further comprises updating the I/O delay time based on a difference between the measured throughput and a target throughput of the storage device to update the measured throughput.

20 Claims, 8 Drawing Sheets

METHOD AND APPARATUS FOR ADJUSTING THROUGHPUT OF STORAGE DEVICE

RELATED APPLICATIONS

This application claim priority from Chinese Patent Application Number CN201610454607.6, filed on Jun. 21, 2016 at the State Intellectual Property Office, China, titled "METHOD AND APPARATUS FOR ADJUSTING THROUGHPUT OF STORAGE DEVICE" the contents of which is herein incorporated by reference in its entirety.

FIELD

Embodiments of the present disclosure relate to the field of computers, and more specifically, to a method and apparatus for adjusting throughput of a storage device.

BACKGROUND

For various applications, a user may allocate different storage devices in a storage system to store data associated with applications. The "storage devices" are also referred to as "storage disks". The user may prioritize various applications and set respective performance targets so as to first meet the performance target of an application with a high priority by controlling resource allocation.

Factors that will affect performance of an application include throughput of a storage device associated with the application. Usually, the throughput may be adjusted by controlling input/output (I/O) delay time of the storage device. Currently, when determining I/O delay time of a storage device, throughput fluctuations caused by time-varying factors such as network delay and workloads of a central processing unit (CPU) are not taken into consideration, which leads to bad application performance and further bad user experience.

SUMMARY

Embodiments of the present disclosure provide a method and apparatus for adjusting throughput of a storage device.

In a first aspect, there is provided a method of adjusting throughput of a storage device. The method comprises setting input/output (I/O) delay time of the storage device to be threshold delay time, the threshold delay time being below initial I/O delay time of the storage device. The method further comprises obtaining measured throughput of the storage device, the measured throughput being associated with the threshold delay time. The method further comprises updating the I/O delay time based on a difference between the measured throughput and target throughput of the storage device to update the measured throughput.

In a second aspect, there is provided an electronic device. The electronic device comprises at least one processor and at least one memory. The at least one memory is coupled to the at least one processor and stores instructions to be executed by the at least one processor. The instructions, when being executed by the at least one processor, cause the electronic device to: set input/output (I/O) delay time of a storage device to be threshold delay time, the threshold delay time being below initial I/O delay time of the storage device; obtain measured throughput of the storage device, the measured throughput being associated with the threshold delay time; and update the I/O delay time based on a difference between the measured throughput and target throughput of the storage device to update the measured throughput.

In a third aspect, there is provided a computer program product. The computer program product is tangibly stored on a non-transient computer readable medium and comprises machine executable instructions which, when executed, cause a machine to execute any step of a method described according to the first aspect of the present disclosure.

The SUMMARY is provided to introduce choices of concepts in a simplified manner, which will be further described in the DETAILED DESCRIPTION below. The Summary is not intended to identify critical features or main features of the embodiments of the present disclosure or limit the scope of the embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1:
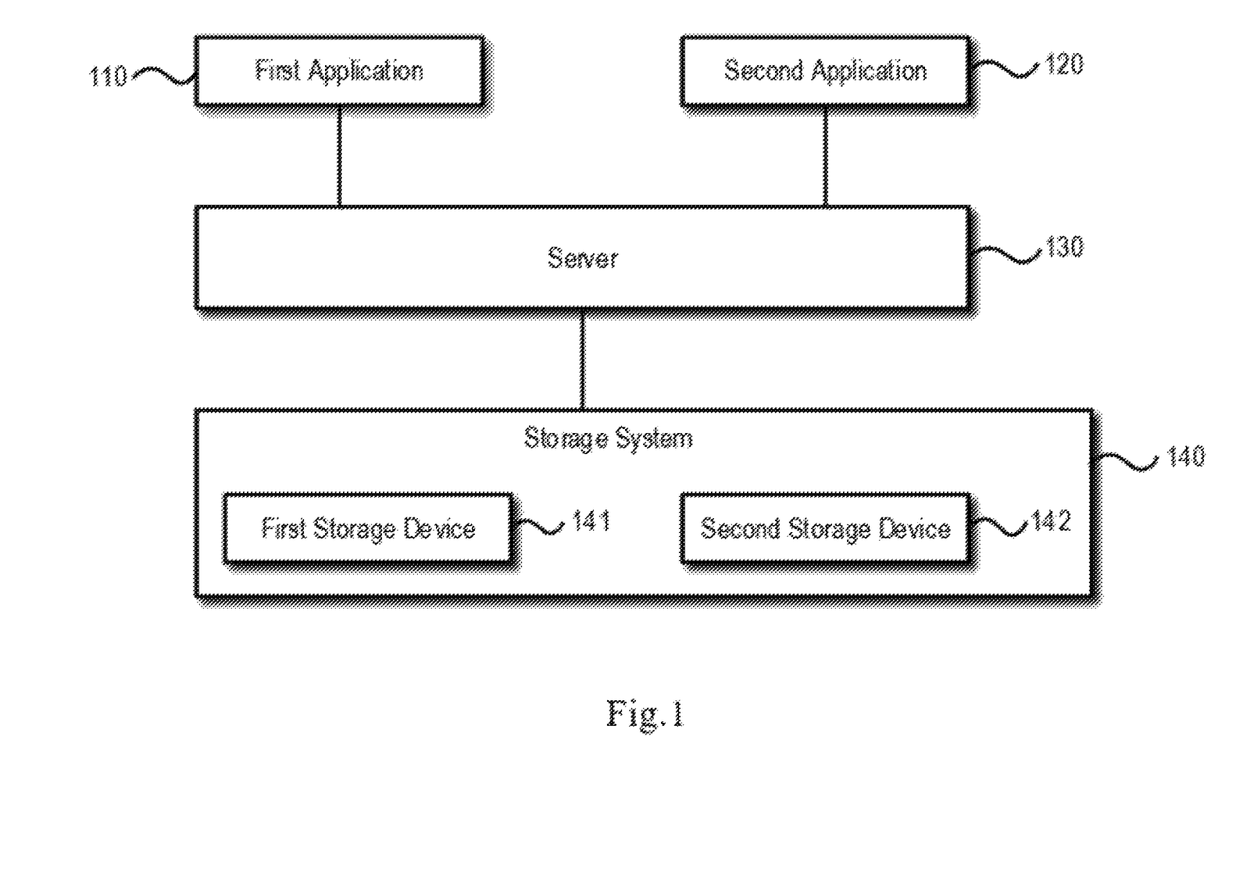
FIG. 1 shows a block diagram of an environment in which the embodiments of the present disclosure may be implemented.

FIG. 1 shows a block diagram of an environment 100 in which the embodiments of the present disclosure may be implemented. As shown in FIG. 1, environment 100 comprises a first application 110, a second application 120, a server 130 and a storage system 140.

In some embodiment, the first application 110 and second application 120 run on the server 130. In other embodiments, the first application 110 and second application 120 run on other computing device that can communicate with the server 130. The scope of the embodiments of the present disclosure is not limited in this regard. The server 130 is configured to manage or otherwise control operations of the storage system 140.

The storage system 140 may comprise a first storage device 141 and a second storage device 142. Examples of the first storage device 141 and second storage device 142 include, but are not limited to, a solid-state drive (SSD), a hard disk drive (HDD), a solid-state hybrid drive (SSHD) or other similar storage device. The first storage device 141 and second storage device 142 are associated via server 130 with a first application 110 and a second application 120 respectively, so as to store data associated with the first application 110 and second application 120 respectively.

The user may prioritize the first application 110 and second application 120 and set respective performance targets so as to first meet the performance target of an application with a higher priority by controlling resource allocation of the server 130.

As described above, factors that will affect performance of an application include throughput of a storage device associated with the application, so throughput of the storage device may be adjusted by controlling I/O delay time of the storage device. For example, where the first application 110 has a higher priority than the second application 120, the server 130 may limit throughput of the second storage device 142 by increasing I/O delay time of the second storage device, so that more resources of the server 130 are allocated to the first application 110 for first meeting the performance target of the first application 110.

It should be understood that only for the illustration purpose, FIG. 1 shows the environment 100 only comprises two applications 110 and 120 and each of them is associated with only one storage device, whereas the scope of the embodiments of the present disclosure is not limited in this regard. There may be any number of applications, and at least one of these applications may be associated with one group of storage devices.

Currently, when determining I/O delay time of a storage device, throughput fluctuations caused by time-varying factors such as network delay and workloads of a CPU are not taken into consideration, which leads to bad application performance. Specifically, in existing solutions, firstly, associated I/O delay time is calculated based on current throughput and a ratio between the current throughput and target throughput is calculated, and then staged processing is performed according to the ratio. Specifically, if the ratio is greater than 1, associated target I/O delay time is calculated according to the target throughput and the I/O delay time is updated with the target I/O delay time. If the ratio is greater than 0.85 and less than 1, it is considered that the current throughput is close to the target throughput and the I/O delay time does not need adjustment. If the ratio is greater than 0.5 and less than 0.85, the I/O delay time associated with the current throughput is decreased by a certain percentage (e.g. 40%) so as to update the I/O delay time. If the ratio is less than 0.5, then the I/O delay time is set to 0.

Figure 2:
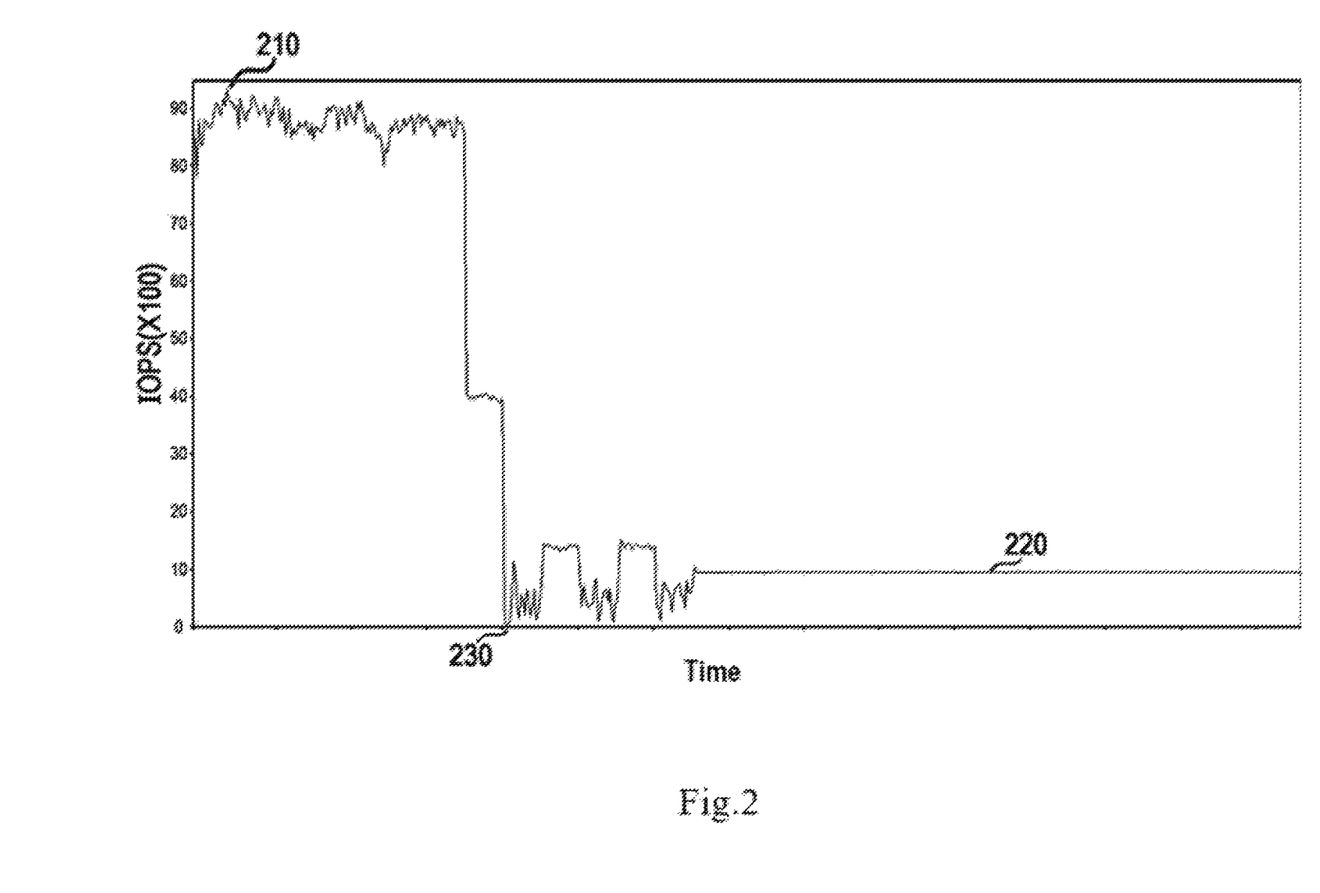
FIG. 2 shows a process of adjusting throughput of a storage device according to existing solutions.
Figure 3:
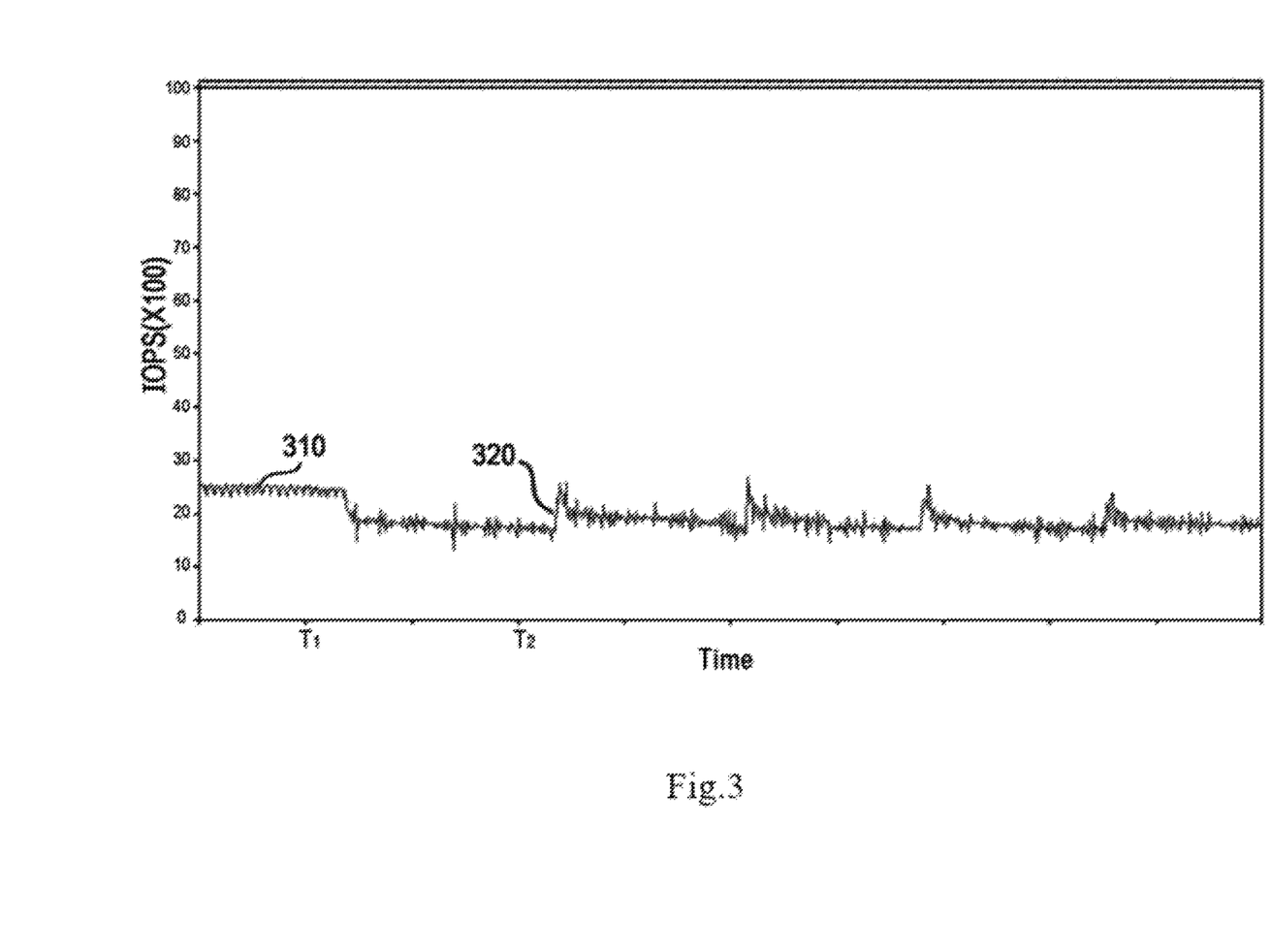
FIG. 3 shows another process of adjusting throughput of a storage device according to existing solutions.

With reference to FIG. 2 and FIG. 3 below, description is presented to the process of adjusting throughput of a storage device using existing solutions. As is well known, the number of I/O requests processed per second (IOPS) may be used as a metric for throughput of a storage device. Therefore, throughput is measured by IOPS in FIGS. 2 and 3.

In FIG. 2, the horizontal axis denotes time and the vertical axis denotes IOPS. As shown in FIG. 2, the storage device's initial IOPS is about 9000 (as shown by 210), and target IOPS is 1000 (as shown by 220). Since a ratio between initial IOPS and target IOPS is greater than 1, according to existing solutions, associated target I/O delay time calculated directly according to the target IOPS is 1 millisecond (1000 μs/1000). Then, I/O delay time is updated as target I/O delay time of 1 millisecond.

As seen from FIG. 2, at the initial stage of throughput adjustment, I/O delay time is set to be target I/O delay time that is relatively long, so that throughput at the initial stage is over limited. In addition, due to the impact of factors such as CPU's workload and/or network latency, the throughput at the initial stage is limited to approach zero (as shown by 230). As a result, situation such as untimely I/O response and no I/O response arises, which makes user experience worse. Furthermore, untimely I/O response or no I/O response will make data associated with an application lost and even unusable.

FIG. 3 shows another process of adjusting throughput of a storage device using existing solutions. Like FIG. 2, in FIG. 3, the horizontal axis denotes time and the vertical axis denotes IOPS. As shown in FIG. 3, the storage device's initial IOPS is about 2500 (as shown by 310) and target IOPS is 2000 (as shown by 320). Since a ratio between initial IOPS and target IOPS is greater than 1, according to existing solutions, at a time point T1, associated target I/O delay time calculated according to the target IOPS is 500 μs ($10^6$ μs/2000). Then, I/O delay time is updated as the target I/O delay time of 500 μs.

However, due to the impact of factors such as CPU's workload and/or network latency in a time period between T1 and T2, obtained IOPS (about 1600) is less than the target IOPS (2000). The ratio between the IOPS and target IOPS is greater than 0.5 and less than 0.85. To reach the target IOPS, at a time point T2, the I/O delay time ($10^6$ μs/1600=625 μs) is decreased by 40% for updating the I/O delay time as 375 μs so as to increase IOPS. However, at the time point T2, the above impact on throughput no longer exists, so that the updated IOPS (about 2500) is higher than the target IOPS (2000). Therefore, the I/O delay time needs to be increased once again so as to decrease the IOPS. As such, the process of increasing and decreasing the I/O delay time is performed repetitively, and throughput joggles around the target throughput, so that application performance is made unstable.

To solve the above and other potential problems in existing solutions, according to the embodiments of the present invention, at the initial stage of throughput adjustment, I/O delay time is set to be threshold delay time below the initial I/O delay time, so that throughput at the initial stage is ensured not to be over low and bad performance is avoided. With reference to FIGS. 4 to 7 below, detailed description is presented to the embodiments of the present disclosure.

Figure 4:
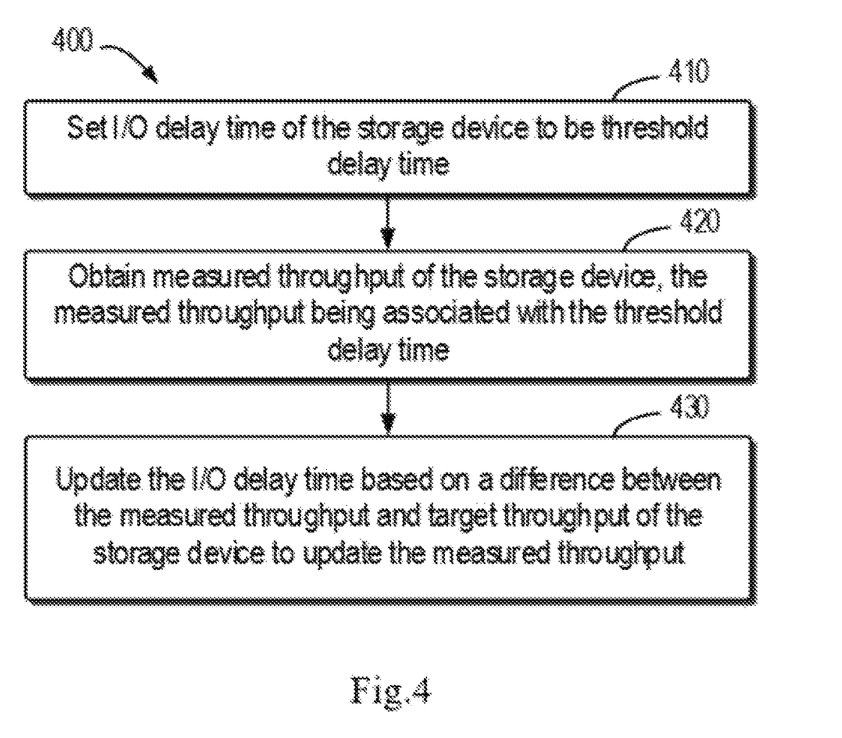
FIG. 4 shows a flowchart of a method of adjusting throughput of a storage device according to an embodiment of the present disclosure.

FIG. 4 shows a flowchart of a method 400 of adjusting throughput of a storage device according to an embodiment of the present disclosure. For example, the method 400 may be executed by the server 130 as shown in FIG. 1, so as to adjust throughput of any one of the first storage device 141 and second storage device 142. For the illustration purpose only, adjusting throughput of the second storage device 142 is taken as an example for description below. It should be understood that the method 400 may further comprise additional steps that are not shown and/or may omit steps that are shown, and the scope of the present disclosure is not limited in this regard.

The method 400 starts at block 410. At block 410, the server 130 sets I/O delay time of storage device 142 to be threshold delay time. The threshold delay time is below initial I/O delay time of the storage device 142. At the initial stage of throughput adjustment, since I/O delay time is set to be threshold delay time that is below initial I/O delay time, throughput at the initial stage will not be over low because of the limitation of threshold delay time, and situations such as untimely I/O response and no I/O response will not arise. Therefore, such operations will not worsen user experience.

In some embodiments, the threshold delay time is determined as a smaller one between a test empirical value of I/O delay time and initial I/O delay time, so as to prevent throughput from falling sharply and thus degrading user experience because the threshold delay time is set to be the test empirical value where the test empirical value is greater than the initial I/O delay time.

At block 420, the server 130 obtains measured throughput of the storage device 142. The measured throughput is associated with the threshold delay time. As used in the present disclosure, the "measured throughput" refers to throughput obtained from an application that manages and controls a storage device. Thereby, the measured throughput can reflect the impact of time-varying factors on throughput. Examples of an application that manages and controls a storage device include, but are not limited to, a driver of the storage device.

At block 430, the server 130 updates the I/O delay time based on a difference between the measured throughput and target throughput of the storage device 142. By updating the I/O delay time, the measured throughput can be updated. In other words, based on the difference between the measured throughput and the target throughput, the I/O delay time is updated on the basis of the threshold delay time. Since the threshold delay time is a smaller value below the initial I/O delay time, updating the I/O delay time on the basis of the threshold delay time will not cause dramatic variations in the I/O delay time. In this manner, dramatic variations in throughput can be avoided, and thus the effect of approaching the target throughput is achieved.

Figure 5:
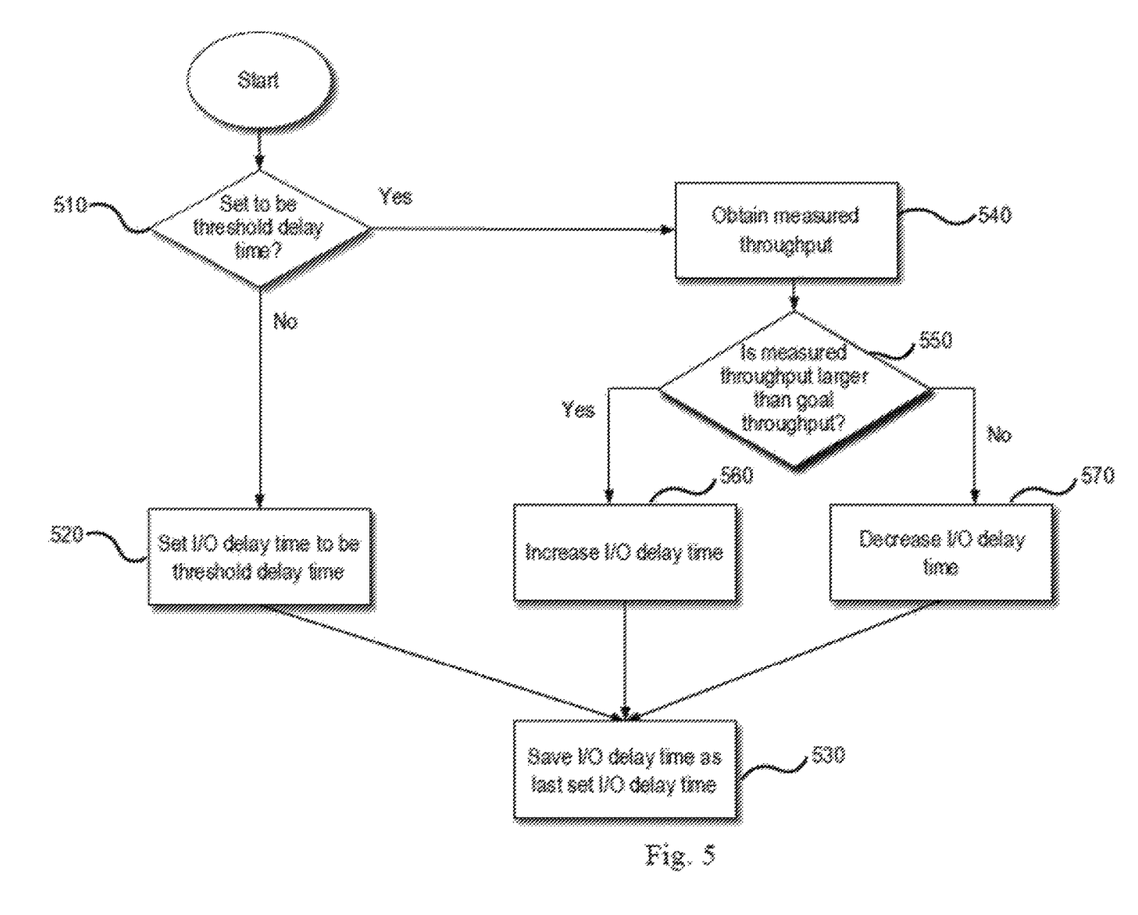
FIG. 5 shows a flowchart of a method of adjusting throughput a storage device according to another embodiment of the present disclosure.

With reference to FIG. 5 below, there is shown a flowchart of a method 500 of adjusting throughput of a storage device according to another embodiment of the present disclosure. The method 500 may be considered as a concrete implementation of above-described method 400, which may further be put into practice in any other appropriate manner.

The method 500 starts at block 510. At block 510, it is determined whether I/O delay time "Delay" of the storage device has been set to be threshold delay time "Delay_threshold", which is below initial I/O delay time of the storage device, e.g. 100 μs.

Besides the I/O delay time, throughput of the storage device may further be adjusted by controlling queue depth. Usually, when adjusting throughput, first adjustment is performed by changing queue depth, for example, reducing throughput by decreasing queue depth. When the queue depth is decreased to a minimum value (i.e., the queue depth equals 1), throughput is further adjusted by controlling the I/O delay time. Therefore, in some embodiments, the method of adjusting throughput by controlling I/O delay time according to an embodiment of the present disclosure may be triggered in response to the queue depth being decreasing to 1. In other words, in some embodiments, if the queue depth is decreased to 1, it may be determined whether I/O delay time "Delay" of the storage device has been set to be threshold delay time "Delay_threshold".

If it is determined at block 510 that I/O delay time "Delay" of the storage device has not been set to be threshold delay time "Delay_threshold", then the method 500 proceeds to block 520, at which I/O delay time "Delay" of the storage device is set to be threshold delay time "Delay_threshold", i.e., Delay=Delay_threshold. At block 530, the threshold delay time "Delay_threshold" is saved as last set I/O delay time "Delay_last", i.e., Delay_last=Delay.

On the other hand, if it is determined at block 510 that I/O delay time "Delay" of the storage device has been set to be threshold delay time "Delay_threshold", the method 500 proceeds to block 540 at which measured throughput $M_{current}$ of the storage device is obtained. The measured throughput $M_{current}$ is associated with the threshold delay time "Delay_threshold". In other words, because the measured throughput $M_{current}$ is the throughput that is measured after applying the threshold delay time "Delay_threshold", the measured throughput $M_{current}$ is able to reflect throughput fluctuations caused by time-varying factors.

At block 550, it is determined whether the measured throughput $M_{current}$ of the storage device is greater than the target throughput $M_{target}$ of the storage device. If the measured throughput $M_{current}$ of the storage device is greater than the target throughput $M_{target}$ of the storage device, the method 500 proceeds to block 560 at which the I/O delay time Delay of the storage device is increased.

In some embodiments, the I/O delay time "Delay" of the storage device may be increased linearly. Of course this is only exemplary and is never intended to limit the embodiments of the present disclosure. In other embodiments, an increase following any other function or mode is feasible. In the embodiment of a linear increase, for example, first of all the ratio between the storage device's measured throughput $M_{current}$ and target throughput $M_{target}$ is determined, i.e., ratio=$M_{current}$/$M_{target}$. Then, the I/O delay time "Delay" is linearly increased to Delay_last*ratio, i.e., Delay=Delay_last*ratio. Since at this point Delay_last equals the threshold delay time that is a smaller value below the initial I/O delay time, the increase of the I/O delay time "Delay" to Delay_last*ratio on the basis of the threshold delay time will not cause sharp variations in the I/O delay time. In turn, this avoids sharp variations in throughput and thus achieves the effect as smoothly approaching the target throughput.

It may be understood that at the initial stage of adjustment, since Delay_last equals the threshold delay time that is a smaller value below the initial I/O delay time, the increased I/O delay time on the Delay_last basis, i.e., Delay_last*ratio is also small and even smaller than measured delay time "Delay_service" that is calculated based on the measured throughput $M_{current}$. As used in the present disclosure, the "measured delay time" refers to theoretical delay time that is calculated based on the measured throughput $M_{current}$. For example, if the measured throughput $M_{current}$ is denoted as 1000 by IOPS, the measured delay time that is calculated based on the measured throughput $M_{current}$ is 1 millisecond (1000 µs/1000). Note these values are only exemplary and not intended to limit the scope of the present disclosure.

Where the I/O delay time Delay_last*ratio is smaller than the measured delay time, if the I/O delay time "Delay" is updated as Delay_last*ratio, updated measured throughput is higher than the measured throughput prior to update, which goes against the objective of reducing the measured throughput. To avoid the occurrence of such situation, in some embodiments, first of all, the measured delay time Delay_service is compared with Delay_last*ratio, and then the I/O delay time "Delay" is updated as a greater one of them, that is, Delay=max(Delay_service, Delay_last*ratio), wherein max( ) denotes a function for choosing the maximum value.

Still refer to FIG. 5. After increasing the I/O delay time at block 560, the method 500 proceeds to block 530 at which the delay time determined at block 560 is saved as the last set I/O delay time Delay_last.

At block 550, if the measured throughput $M_{current}$ is less than or equal to the target throughput $M_{target}$ (i.e., the measured throughput $M_{current}$ is below the target throughput $M_{target}$), the method 500 proceeds to block 570 so as to decrease the I/O delay time "Delay". For the sake of discussion, the I/O delay time determined at block 570 is called "first I/O delay time" below.

In some embodiments, decreasing the I/O delay time Delay comprises linearly decreasing the I/O delay time Delay. For example, first of all, the ratio between the storage device's measured throughput $M_{current}$ and target throughput $M_{target}$ is determined, i.e., ratio=$M_{current}/M_{target}$. Afterwards, the I/O delay time Delay is linearly decreased to Delay_last*ratio, i.e., Delay=Delay_last*ratio.

As described above with reference to FIG. 3, while decreasing the I/O delay time so as to increase throughput, throughput is prone to joggle around the target throughput, which makes performance unstable. In order to avoid the situation, in some embodiments, the first I/O delay time may be increased by a predetermined amount so as to obtain second I/O delay time and further update I/O delay time. In particular, according to an embodiment of the present disclosure, measured throughput associated with the second I/O delay time should be smaller than measured throughput associated with the first I/O delay time. By increasing the first I/O delay time by a predetermined amount, the increment of associated measured throughput is reduced, the throughput increase is prevented from exceeding the target throughput and further throughput is prevented from joggling around the target throughput.

Consider an example. In some embodiments, the first I/O delay time may be increased by a predetermined multiple τ. In one embodiment, the predetermined multiple τ ranges between 1.05 and 1.2. Of course, any other appropriate range is also possible depending on concrete needs and environments. Since the first I/O delay time is increased by the predetermined multiple τ, i.e., the first I/O delay time is increased from Delay_last*ratio to Delay_last*ratio*τ, so that Delay_last*ratio*τ is likely to be greater than the last set I/O delay time Delay_last. If the I/O delay time Delay is updated as Delay_last*ratio*τ, then the updated measured throughput is made lower than the measured throughput prior to update, which goes against the objective of increasing the measured throughput. To avoid such situation, in some embodiments, first of all, the last set I/O delay time Delay_last is compared with Delay_last*ratio*τ, and then the I/O delay time Delay is updated as a smaller one of them, that is, Delay=min(Delay_last,Delay_last*ratio*τ).

Still refer to FIG. 5. After increasing the I/O delay time at block 570, the method 500 proceeds to block 530 at which the delay time determined at block 570 is saved as the last set I/O delay time Delay_last.

It may be understood that the number of I/O requests from an application varies with time. Therefore, once triggered, the method according to an embodiment of the present invention will be executed at a predetermined time interval so as to achieve dynamic adjustment of throughput. For example, upon the trigger, blocks 510, 520 and 530 in method 500 are executed at a first time point, and blocks 510, 540, 550, 560 and 530, or 510, 540, 550, 570 and 530 in method 500 are executed at a second time point. In some embodiments, the predetermined time interval ranges between 15 seconds and 30 seconds.

For the sake of a clearer understanding of the present disclosure, with reference to Table 1 and FIG. 6, description is presented below to the method for adjusting throughput of a storage device according to an example of the present disclosure. It should be understood that the example is only for enabling those skilled in the art to have a more intuitive understanding of the present disclosure and is not intended to limit the scope of the present disclosure.

As described above, IOPS may be used as a metric for throughput of a storage device. Hereinafter, the method according to the example will be described by taking IOPS as an example. It should be understood that any other appropriate metric may further be used, and the scope of the present disclosure is not limited in this regard.

TABLE 1

| Poll Time | | IOPS | Queue Depth | I/O Delay Time (µs) |
|---|---|---|---|---|
| $T_1$ | 3:41:43 AM | 9879.78033 | 64 | 0 |
| $T_2$ | 3:42:03 AM | 9906.764442 | 32 | 0 |
| $T_3$ | 3:42:23 AM | 9870.697396 | 16 | 0 |
| $T_4$ | 3:42:43 AM | 9850.992717 | 8 | 0 |
| $T_5$ | 3:43:03 AM | 8404.769031 | 4 | 0 |
| $T_6$ | 3:43:23 AM | 3667.225069 | 1 | 100 |
| $T_7$ | 3:43:44 AM | 3653.091042 | 1 | 273 |
| $T_8$ | 3:44:06 AM | 1590.128855 | 1 | 665 |
| $T_9$ | 3:44:27 AM | 1409.688249 | 1 | 705 |
| $T_{10}$ | 3:44:49 AM | 1415.029221 | 1 | 705 |
| $T_{11}$ | 3:45:10 AM | 1411.479386 | 1 | 705 |
| $T_{12}$ | 3:45:31 AM | 1417.441533 | 1 | 705 |
| $T_{13}$ | 3:45:53 AM | 1418.465228 | 1 | 705 |
| $T_{14}$ | 3:46:14 AM | 1406.748526 | 1 | 705 |
| $T_{15}$ | 3:46:35 AM | 1415.343037 | 1 | 705 |
| $T_{16}$ | 3:46:56 AM | 1417.429235 | 1 | 705 |
| $T_{17}$ | 3:47:17 AM | 1416.434415 | 1 | 705 |
| $T_{18}$ | 3:47:39 AM | 1412.246091 | 1 | 705 |
| $T_{19}$ | 3:48:00 AM | 1421.364018 | 1 | 705 |

Table 1 shows a timetable of the method of adjusting throughput of a storage device according to an example. Steps of the method of adjusting throughput of a storage device are performed at the "Poll Time" shown in the first column of Table 1, and IOPS, Queue Depth and I/O Delay Time at performance of various steps are shown in the second to fourth columns of Table 1 respectively.

Figure 6:
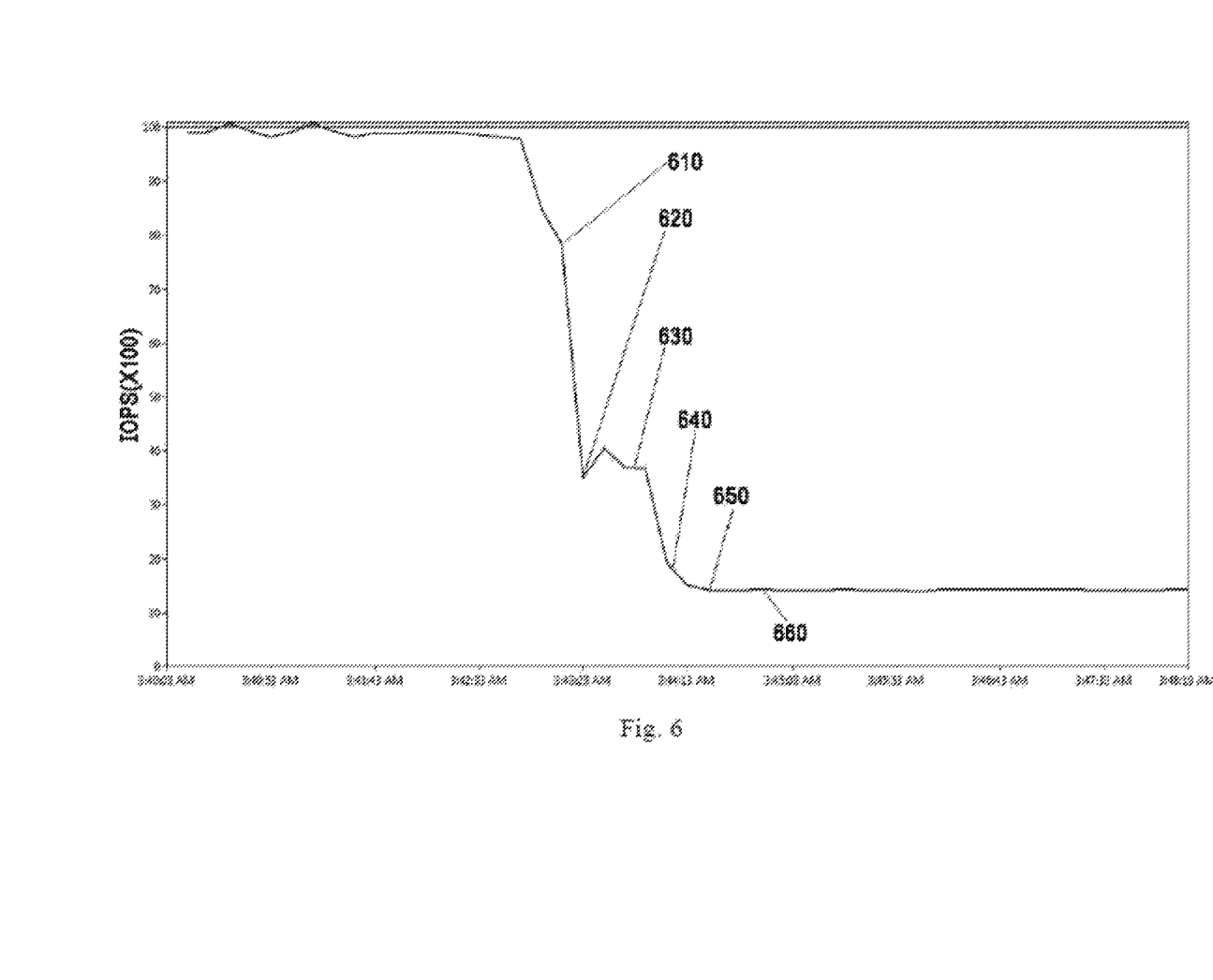
FIG. 6 shows a process of adjusting throughput of a storage device according to an example of the present disclosure.

FIG. 6 shows results obtained from performing the method according to the concrete example. In this figure, the horizontal axis denotes poll time, and the vertical axis denotes IOPS. Refer to FIG. 6 and Table 1. At 610 (time Ts=3:43:03 AM), the queue depth is decreased from 4 to 1, and the I/O delay time Delay of the storage device is set to be the threshold delay time. In this example, the threshold delay time is determined as a smaller one of the test empirical value (100) of I/O delay time and the initial I/O delay time ($10^6/8404$), i.e., Delay=min(100,$10^6$/8404)=100

(μs). At this point, the threshold delay time is saved at 610 as the last set I/O delay time Delay_last, i.e., Delay_last=100 (μs).

At 620 (time $T_6$=3:43:23 AM), measured throughput $M_{current}$≈3667 of the storage device is obtained, and the measured throughput $M_{current}$≈3667 is associated with the threshold delay time "Delay" of 100. In addition, the ratio between measured throughput $M_{current}$ (3667) and target throughput $M_{target}$ (1500) is determined, i.e., ratio=$M_{current}$/$M_{target}$=3667/1500=2.44. Next, measured delay time Delay_service=$10^6$/3667≈273 is determined, and Delay_last*ratio=100*2.44=244 is determined. Afterwards, the I/O delay time "Delay" is updated as a greater one of Delay_service and Delay_last*ratio, i.e., Delay=max(Delay_service, Delay_last*ratio)=(273, 244)=273 (μs).

As seen from FIG. 6, at the initial stage (with reference to the curve between 610 and 620) of throughput adjustment, since the I/O delay time is set to be the threshold delay time (100 μs) below the initial I/O delay time, throughput (about 3667) at the initial stage will not be over low because of the limitation of threshold delay time, such situation as untimely I/O response and no I/O response will not arise, and further user experience will not be degraded.

At 630 (time $T_7$=3:43:44 AM), the measured throughput $M_{current}$≈3653 of the storage device is obtained. In addition, the ratio between measured throughput $M_{current}$ (3653) and target throughput $M_{target}$ (1500) is determined, i.e., ratio=$M_{current}$/$M_{target}$=3653/1500=2.435. Then, the measured delay time Delay_service=$10^6$/3653≈273.7 is determined, and Delay_last*ratio=273*2.435=665 is determined. Subsequently, the I/O delay time Delay is updated as a greater one of Delay_service and Delay_last*ratio, i.e., Delay=max(Delay_service, Delay_last*ratio)=(273.7, 665)=665 (μs).

At 640 (time $T_8$=3:44:06 AM), the measured throughput $M_{current}$≈1590 of the storage device is obtained. In addition, the ratio between measured throughput $M_{current}$ (1590) and target throughput $M_{target}$ (1500) is determined, i.e., ratio=$M_{current}$/$M_{target}$=1590/1500=1.06. Then, the measured delay time Delay_service=$10^6$/1590≈628.9 is determined, and Delay_last*ratio=665*1.06=705 is determined. Subsequently, the I/O delay time Delay is updated as a greater one of Delay_service and Delay_last*ratio, i.e., Delay=max(Delay_service, Delay_last*ratio)=(628.9, 705)=705 (μs).

As seen from FIG. 6, at the stage (with reference to the curve between 620 and 640) of updating throughput, since the threshold delay time is set to be a smaller value (100 μs) than the initial I/O delay time, updating the I/O delay time on the basis of the threshold delay time (proportionally increasing the L/O delay time at this stage) will not cause dramatic variations in I/O delay time, and further will not cause dramatic variations in throughput, so the effect as smoothly approaching the target throughput is achieved (throughput is smoothly decreased from 3667 to 1590).

At 650 (time $T_9$=3:44:27 AM), the measured throughput $M_{current}$≈1409 of the storage device is obtained. In addition, the ratio between measured throughput $M_{current}$ (1409) and target throughput $M_{target}$ (1500) is determined, i.e. ratio=$M_{current}$/$M_{target}$=1409/1500=0.939. Then, Delay_last*ratio*τ (*τ is the increase of delay time, and *τ=1.1 in this example)=705*0.939*1.1≈728 is determined. Subsequently, the I/O delay time Delay is updated as a greater one of Delay_last and Delay_last*ratio*τ, i.e., Delay=min (Delay_last, Delay_last*ratio*τ)=min (705, 728)=705.

At 660 (time $T_{10}$=3:44:49 AM), the measured throughput $M_{current}$≈1415 of the storage device is obtained. Since at 650 the I/O delay time Delay is updated as a smaller one of Delay_last and Delay_last*ratio*τ, it is avoided that the updated measured throughput is less than the measured throughput prior to update, the difference between the updated measured throughput and the target throughput is prevented from being increased and the approach of the target throughput is prevented from being postponed. In addition, by increasing the I/O delay time Delay_last*ratio by a certain amount (τ), the increment of associated measured throughput is reduced, the throughput increase is prevented from exceeding the target throughput, and further throughput is prevented from joggling around the target throughput.

Next, at time $T_{11}$ to $T_{19}$, operations at time $T_{10}$=3:44:49 AM are repeated, so that throughput is adjusted to 1421, and the target throughput 1500 is smoothly approached.

Figure 7:
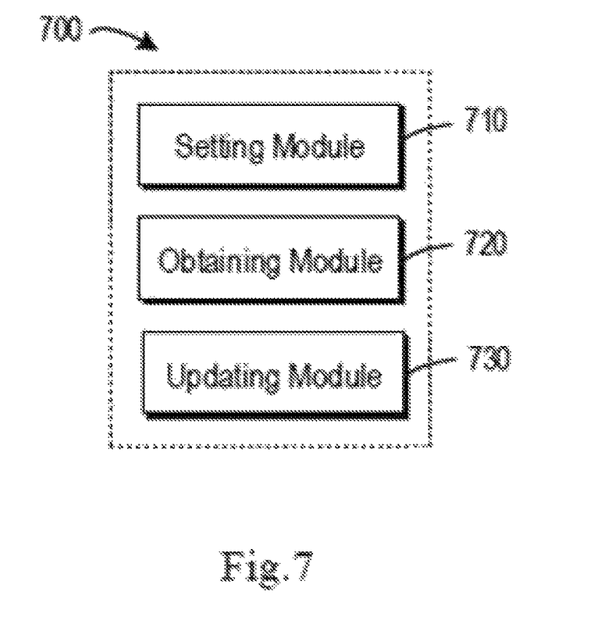
FIG. 7 shows a block diagram of an apparatus for adjusting throughput of a storage device according to an embodiment of the present disclosure.

FIG. 7 shows a block diagram of an apparatus 700 for adjusting throughput of a storage device according to an embodiment of the present disclosure. As shown in FIG. 7, the apparatus 700 may comprise a setting module 710 configured to set input/output (I/O) delay time of the storage device to be threshold delay time. The threshold delay time is below initial I/O delay time of the storage device. Apparatus 700 may further comprise a obtaining module 720 configured to obtain measured throughput of the storage device, the measured throughput being associated with the threshold delay time. Apparatus 700 may further comprise an updating module 730 configured to update the I/O delay time based on a difference between the measured throughput and target throughput of the storage device so as to update the measured throughput.

In some embodiments, updating the I/O delay time comprises: in response the measured throughput being greater than the target throughput, increasing the I/O delay time.

In some embodiments, increasing the I/O delay time comprises: linearly increasing the I/O delay time.

In some embodiments, updating the I/O delay time comprises: in response to the measured throughput being below the target throughput, decreasing the I/O delay time so as to obtain first I/O delay time.

In some embodiments, decreasing the I/O delay time comprises: linearly decreasing the I/O delay time.

In some embodiments, updating the I/O delay time further comprises: increasing the first I/O delay time by a predetermined amount so as to obtain second I/O delay time, so that measured throughput associated with the second I/O delay time is less than measured throughput associated with the first I/O delay time.

In some embodiments, increasing the first I/OS delay time by a predetermined amount comprises increasing the first I/O delay time by a predetermined multiple, the predetermined multiple ranging between 1.05 and 1.2.

For the clarity purpose, FIG. 7 does not show optional units of apparatus 700. However, it should be understood that various features described with reference to FIGS. 1 and 4-6 are also applicable to the apparatus 700. Moreover, various modules of the apparatus 700 may be hardware module or software module. For example, in some embodiments, the apparatus 700 may be implemented partially or completely with software and/or firmware, for example, implemented as a computer program product embodied on a computer readable medium. Alternatively or additionally, the apparatus 700 may be implemented partially or completely with hardware, for example, implemented as an integrated circuit (IC) chip, application-specific integrated circuit (ASIC), system on chip (SOC), field programmable gate array (FPGA) etc. The scope of the present invention is not limited in this regard.

Figure 8:
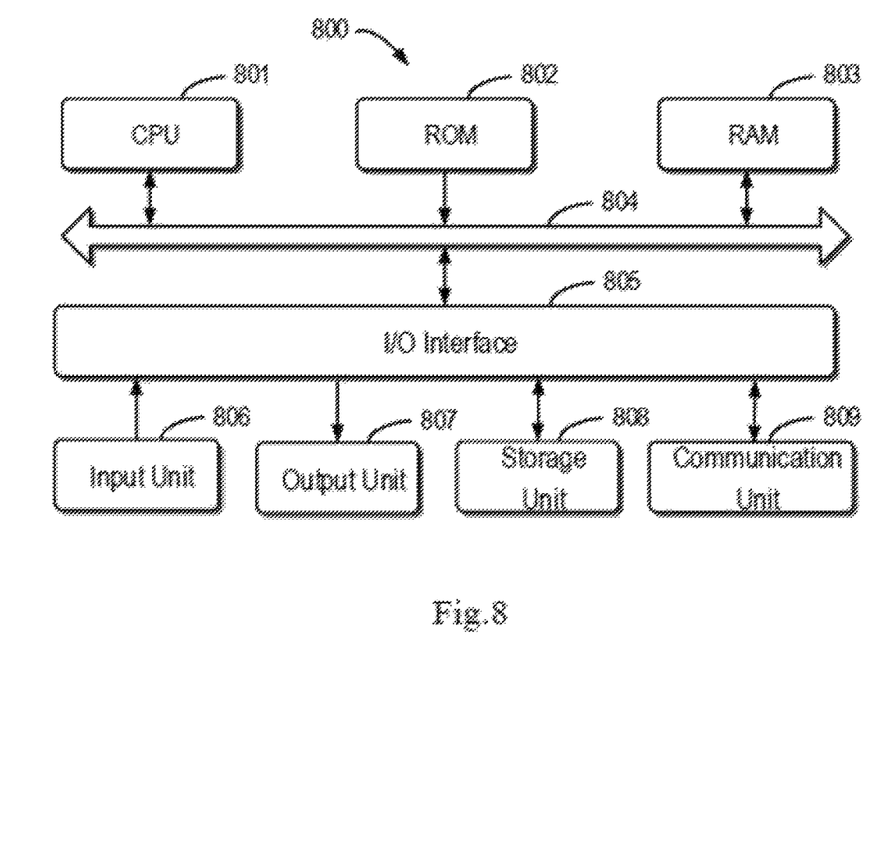
FIG. 8 shows a schematic block diagram of an exemplary device which is applicable to implement the embodiments of the present invention.

FIG. 8 illustrates a schematic block diagram of an exemplary device 800 which is applicable to implement the embodiments of the present disclosure. As illustrated in FIG. 8, the device 800 includes: Central Process Unit (CPU) 801, which may execute various appropriate actions and treatment according to computer program instructions stored in Read Only Memory (ROM) 802 or computer program instructions loaded from a memory unit 808 to Random Access Memory (RAM) 803. In RAM 803, there may be stored various programs and data needed by operations of device 800. CPU 801, ROM 802 and RAM 803 are coupled to one another via a bus 804. An input/output (I/O) interface 805 is also coupled to bus 804.

Multiple components in device 800 are coupled to I/O interface 805, including: an input unit 806, such as a keyboard, a mouse, etc.; an output unit 807, such as various types of displays and loudspeakers, etc.; a storage unit 808, such as a magnetic disk, an optical disk, etc.; and a communication unit 809, such as an Internet card, a modem, a wireless communication transceiver, etc. Communication unit 809 allows device 800 to exchange information/data with other device by means of a computer network such as the Internet and/or various telecommunication networks.

Various processes and treatment described above, for example, method 400 and/or 500, may be executed by a processing unit 801. For example, in some embodiment, method 400 and/or 500 may be implemented as a computer software program, which is tangibly embodied on a machine readable medium such as memory unit 808. In some embodiments, part or all of the computer program may be loaded and/or installed to device 800 via ROM 802 and/or communication unit 809. The computer program, when loaded to RAM 803 and executed by CPU 801, may perform one or more steps of method 400 and/or 500 described above. Alternatively, in other embodiments, CPU 801 may also be configured in any other appropriate manner so as to implement method 400 and/or 500.

The present disclosure may be a method, apparatus, system and/or computer program product. The computer program product may include a computer readable storage medium having computer readable program instructions for executing various aspects of the present disclosure carried thereon.

The computer readable storage medium may be a tangible device that may hold and store instructions used by an instruction execution device. The computer readable storage medium may be, for example, but not limited to, an electronic, magnetic, optical, electromagnetic, or semiconductor storage device or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanical coding device such as a punch card having instructions stored thereon, or any suitable combination of the foregoing. The computer readable storage medium used here is not interpreted as an instantaneous signal itself, such as a radio wave or other freely propagated electromagnetic wave, electromagnetic wave propagated through a waveguide or other transmission medium (such as an optical pulse through an optical fiber cable), or an electric signal transmitted through an electric wire).

The computer readable program instructions described here may be loaded from the computer readable storage medium to various computing/processing devices, or loaded to an external computer or external storage device via a network such as the Internet, a local area network, a wide area network and/or a wireless network. The network may comprise a copper transmission cable, optical transmission, wireless transmission, router, firewall, switch, gateway computer and/or edge server. The network adapter card or network interface in each computing/processing device receives computer readable program instructions from the network and forwards the computer readable program instructions so as to be stored in computer readable storage media in various computing/processing devices.

The computer program instructions used for executing operations of the present disclosure may be assembly instructions, instruction set architecture (ISA) instructions, machine instructions, machine-related instructions, micro code, firmware instructions, status setting data, or source code or target code written in one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry may be customized using status information of the computer readable program instructions, such as programmable logic circuit, field programmable gate array (FPGA) or programmable logic array (PLA), which electronic circuitry may execute the computer readable program instructions and thereby implement various aspects of the present disclosure.

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of adjusting throughput of a storage device, comprising:
    setting input/output (I/O) delay time of the storage device to be threshold delay time, the threshold delay time being below initial I/O delay time of the storage device;
    obtaining measured throughput of the storage device, the measured throughput being associated with the threshold delay time; and
    updating the I/O delay time based on a difference between the measured throughput and a target throughput of the storage device to update the measured throughput, wherein updating the I/O delay time comprises determining a ratio between the measured throughput and the target throughput.

2. The method according to claim 1, wherein updating the I/O delay time comprises:
    in response the measured throughput being greater than the target throughput, increasing the I/O delay time.

3. The method according to claim 2, wherein increasing the I/O delay time comprises:
    linearly increasing the I/O delay time based upon, at least in part, the ratio between the measured throughput and the target throughput.

4. The method according to claim 1, wherein updating the I/O delay time comprises:
    in response to the measured throughput being below the target throughput, decreasing the I/O delay time to obtain first I/O delay time.

5. The method according to claim 4, wherein decreasing the I/O delay time comprises:
    linearly decreasing the I/O delay time based upon, at least in part, the ratio between the measured throughput and the target throughput.

6. The method according to claim 4, wherein updating the I/O delay time further comprises:
    increasing the first I/O delay time by a predetermined amount to obtain second I/O delay time, such that the measured throughput associated with the second I/O delay time is less than the measured throughput associated with the first I/O delay time.

7. The method according to claim 6, wherein increasing the first I/O delay time by the predetermined amount comprises:
    increasing the first I/O delay time by a predetermined multiple of the first I/O delay time, the predetermined multiple being in a range of 1.05 to 1.2.

8. An electronic device, comprising:
    at least one processor;
    at least one memory coupled to the at least one processor and storing instructions to be executed by the at least one processor, the instructions, when executed by the at least one processor, causing the device to perform acts including:
        setting input/output (I/O) delay time of a storage device to be threshold delay time, the threshold delay time being below initial I/O delay time of the storage device;
        obtaining measured throughput of the storage device, the measured throughput being associated with the threshold delay time; and
        updating the I/O delay time based on a difference between the measured throughput and target throughput of the storage device to update the measured throughput, wherein updating the I/O delay time comprises determining a ratio between the measured throughput and the target throughput.

9. The electronic device according to claim 8, wherein updating the I/O delay time comprises:
    in response the measured throughput being greater than the target throughput, increasing the I/O delay time.

10. The electronic device according to claim 9, wherein increasing the I/O delay time comprises:
    linearly increasing the I/O delay time based upon, at least in part, the ratio between the measured throughput and the target throughput.

11. The electronic device according to claim 8, wherein updating the I/O delay time comprises:
    in response to the measured throughput being below the target throughput, decreasing the I/O delay time to obtain first I/O delay time.

12. The electronic device according to claim 11, wherein decreasing the I/O delay time comprises:
    linearly decreasing the I/O delay time based upon, at least in part, the ratio between the measured throughput and the target throughput.

13. The electronic device according to claim 11, wherein updating the I/O delay time further comprises:

increasing the first I/O delay time by a predetermined amount to obtain second I/O delay time, such that the measured throughput associated with the second I/O delay time is less than the measured throughput associated with the first I/O delay time.

14. The electronic device according to claim 13, wherein increasing the first I/O delay time by the predetermined amount comprises:
increasing the first I/O delay time by a predetermined multiple of the first I/O delay time, the predetermined multiple being in a range of 1.05 to 1.2.

15. A computer program product for adjusting throughput of a storage device, comprising:
a non-transitory computer readable medium encoded with computer-executable code, the code configured to enable the execution of:
setting input/output (I/O) delay time of the storage device to be threshold delay time, the threshold delay time being below initial I/O delay time of the storage device;
obtaining measured throughput of the storage device, the measured throughput being associated with the threshold delay time; and
updating the I/O delay time based on a difference between the measured throughput and a target throughput of the storage device to update the measured throughput, wherein updating the I/O delay time comprises determining a ratio between the measured throughput and the target throughput.

16. The computer program product of claim 15, wherein updating the I/O delay time comprises:
in response the measured throughput being greater than the target throughput, increasing the I/O delay time.

17. The computer program product of claim 16, wherein increasing the I/O delay time comprises:
linearly increasing the I/O delay time based upon, at least in part, the ratio between the measured throughput and the target throughput.

18. The computer program product of claim 15, wherein updating the I/O delay time comprises:
in response to the measured throughput being below the target throughput, decreasing the I/O delay time to obtain first I/O delay time.

19. The computer program product of claim 18, wherein decreasing the I/O delay time comprises:
linearly decreasing the I/O delay time based upon, at least in part, the ratio between the measured throughput and the target throughput.

20. The computer program product of claim 18, wherein updating the I/O delay time further comprises:
increasing the first I/O delay time by a predetermined amount to obtain second I/O delay time, such that the measured throughput associated with the second I/O delay time is less than the measured throughput associated with the first I/O delay time.

* * * * *